US012019566B2

(12) United States Patent
Blagodurov et al.

(10) Patent No.: US 12,019,566 B2
(45) Date of Patent: Jun. 25, 2024

(54) ARBITRATING ATOMIC MEMORY OPERATIONS

(71) Applicant: ADVANCED MICRO DEVICES, INC., Santa Clara, CA (US)

(72) Inventors: Sergey Blagodurov, Bellevue, WA (US); Johnathan Alsop, Bellevue, WA (US); Jagadish B. Kotra, Austin, TX (US); Marko Scrbak, Austin, TX (US); Ganesh Dasika, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 56 days.

(21) Appl. No.: 16/938,364

(22) Filed: Jul. 24, 2020

(65) Prior Publication Data
US 2022/0027291 A1 Jan. 27, 2022

(51) Int. Cl.
*G06F 13/16* (2006.01)
*G06F 9/30* (2018.01)
*H04L 45/122* (2022.01)

(52) U.S. Cl.
CPC ........ *G06F 13/1642* (2013.01); *G06F 9/3004* (2013.01); *G06F 9/30098* (2013.01); *G06F 13/1663* (2013.01); *H04L 45/122* (2013.01)

(58) Field of Classification Search
None
See application file for complete search history.

(56) References Cited

U.S. PATENT DOCUMENTS

| | | | | |
|---|---|---|---|---|
| 5,446,862 A | * | 8/1995 | Ohkami | G06F 13/1652 711/100 |
| 6,052,763 A | * | 4/2000 | Maruyama | G06F 13/1652 711/163 |
| 2007/0038792 A1 | * | 2/2007 | Shin | G06F 13/1626 710/240 |
| 2009/0292885 A1 | * | 11/2009 | Molgaard | G06F 13/1631 711/E12.098 |
| 2015/0100749 A1 | * | 4/2015 | Koker | G06F 9/3004 711/169 |

OTHER PUBLICATIONS

Culler et al. Parallel Computer Architecture. 1997. Morgan Kaufmann. pp. 156-161.*
Hennessy et al. Computer Architecture: A Quantiative Approach. 2003. Morgan Kaufmann. pp. 500-509.*
Shen et al. Modern Processor Design. 2003. McGraw-Hill. pp. 4-5.*
AMD, AMD64 Technology, AMD64 Architecture Programmer's Manual vol. 3: General-Purpose and System Instructions, URL: https://www.amd.com/system/files/TechDocs/24594.pdf, Publication No. 23594, Revision 3.30, Date: Apr. 2020, 654 pages.
Niu et al., HOGWILD!: A Lock-Free Approach to Parallelizing Stochastic Gradient Descent, Computer Sciences Department, University of Wisconsin-Madison, URL: https://arxiv.org/abs/1106.5730, dated Jun. 2011, 22 pages.
Redfish, Redfish DMTF, URL: https://www.dmtf.org/standards/redfish, 2020 DMTF, printed May 6, 2020, 8 pages.

* cited by examiner

*Primary Examiner* — Nathan Sadler

(57) ABSTRACT
Arbitrating atomic memory operations, including: receiving, by a media controller, a plurality of atomic memory operations; determining, by an atomics controller associated with the media controller, based on one or more arbitration rules, an ordering for issuing the plurality of atomic memory operations; and issuing the plurality of atomic memory operations to a memory module according to the ordering.

23 Claims, 10 Drawing Sheets

ARBITRATING ATOMIC MEMORY OPERATIONS

BACKGROUND

Multiple nodes in a distributed system issue atomic memory operations to memory modules accessible to other nodes. Where multiple requestors are attempting to perform atomic memory operations on the same memory module, the requestors effectively compete for access to the memory module.

DETAILED DESCRIPTION

Figure 1:
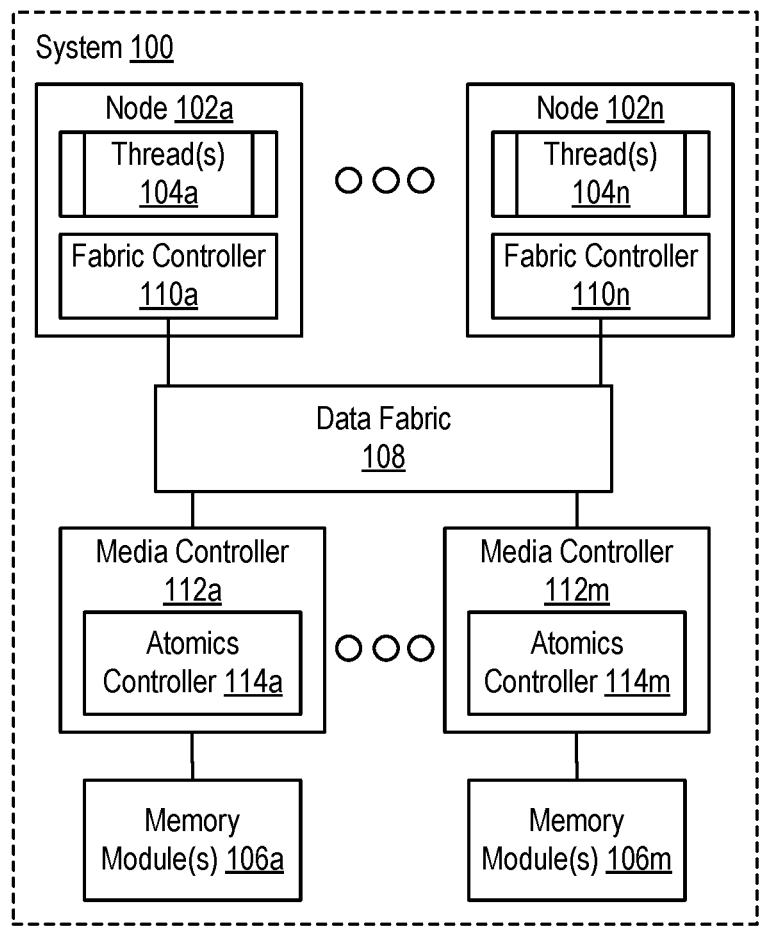
FIG. 1 is a block diagram of an example system for arbitrating atomic memory operations according to some embodiments.

In some embodiments, a method of arbitrating atomic memory operations includes: receiving, by a media controller, a plurality of atomic memory operations; determining, by an atomics controller associated with the media controller, based on one or more arbitration rules, an ordering for issuing the plurality of atomic memory operations; and issuing the plurality of atomic memory operations to a memory module according to the ordering.

In some embodiments, determining the ordering for issuing the plurality of atomic memory operations includes determining, for each requestor associated with the plurality of atomic memory operations, a recency of access for the memory module; and the ordering is based on the recency of access for each requestor associated with the plurality of atomic memory operations. In some embodiments, determining the ordering for issuing the plurality of atomic memory operations includes determining, for each requestor associated with the plurality of atomic memory operations, a network distance to the media controller; and the ordering is based on the network distance for each requestor associated with the plurality of atomic memory operation. In some embodiments, the network distance includes a latency. In some embodiments, the network distance includes a number of hops to the media controller. In some embodiments, the method further includes: determining that a rate of receiving atomic memory operations falls below a threshold; and issuing one or more other atomic memory operations independent of the one or more arbitration rules. In some embodiments, the method further includes providing, by the media controller, to a fabric controller associated with a requestor of an atomic memory operation of the plurality of atomic memory operations, an indication that the atomic memory operation is complete.

In some embodiments, an apparatus for arbitrating atomic memory operations performs steps including: receiving, by a media controller, a plurality of atomic memory operations; determining, by an atomics controller associated with the media controller, based on one or more arbitration rules, an ordering for issuing the plurality of atomic memory operations; and issuing the plurality of atomic memory operations to a memory module according to the ordering.

In some embodiments, determining the ordering for issuing the plurality of atomic memory operations includes determining, for each requestor associated with the plurality of atomic memory operations, a recency of access for the memory module; and the ordering is based on the recency of access for each requestor associated with the plurality of atomic memory operations. In some embodiments, determining the ordering for issuing the plurality of atomic memory operations includes determining, for each requestor associated with the plurality of atomic memory operations, a network distance to the media controller; and the ordering is based on the network distance for each requestor associated with the plurality of atomic memory operation. In some embodiments, the network distance includes a latency. In some embodiments, the network distance includes a number of hops to the media controller. In some embodiments, the steps further include: determining that a rate of receiving atomic memory operations falls below a threshold; and issuing one or more other atomic memory operations independent of the one or more arbitration rules. In some embodiments, the steps further include providing, by the media controller, to a fabric controller associated with a requestor of an atomic memory operation of the plurality of atomic memory operations, an indication that the atomic memory operation is complete.

In some embodiments, a method of handling data fabric events includes: receiving, by a fabric controller associated with a requestor of an operation, an indication that the requested operation is complete; indicating, by the fabric controller, to a thread associated with the requested operation that the requested operation is complete; and wherein the thread is performs one or more other operations during completion of the requested operation.

In some embodiments, indicating to the thread that the requested operation is complete includes sending an interrupt to the thread. In some embodiments, indicating to the thread that the requested operation is complete includes modifying a value of a register accessible to the thread. In some embodiments, the method further includes: receiving, from the thread, the requested operation, wherein the requested operation is directed to a first device; determining a second device different than the first device; and sending the requested operation to the second device. In some embodiments, the second device is determined based on a load associated with the first device and/or the second device.

In some embodiments, an apparatus for handling data fabric events performs steps including: receiving, by a fabric controller associated with a requestor of an operation, an indication that the requested operation is complete; indicating, by the fabric controller, to a thread associated with the requested operation that the requested operation is complete; and wherein the thread is performs one or more other operations during completion of the requested operation.

In some embodiments, indicating to the thread that the requested operation is complete includes sending an interrupt to the thread. In some embodiments, indicating to the thread that the requested operation is complete includes modifying a value of a register accessible to the thread. In some embodiments, the steps further include: receiving, from the thread, the requested operation, wherein the requested operation is directed to a first device; determining a second device different than the first device; and sending the requested operation to the second device. In some embodiments, the second device is determined based on a load associated with the first device and/or the second device.

FIG. 1 is a block diagram of a non-limiting example system 100. The example system 100 can be implemented in a variety of computing systems, including data centers, distributed systems, composable systems, and the like. The system 100 includes a plurality of nodes 102a-n. In some embodiments, the nodes 102a-n include computing devices such as servers (e.g., servers in a data center configuration or other configuration). In other embodiments, the nodes 102a-n include logical groupings of processing, storage, and memory resources, such as in a composable system. Each node 102a-n executes one or more threads 104a-n to facilitate performance of designated or requested tasks.

The system 100 also includes a plurality of memory modules 106a-m. The memory modules 106a-m include volatile and/or non-volatile storage accessible to the nodes 102a-n. The nodes 102a-n issue memory operations (e.g., read operations, write operations) to the memory modules 106a-m via a data fabric 108. The data fabric 108 includes a fabric of latches, switches, and/or routing components to facilitate between components of the system 100 (e.g., nodes 102a-n and memory modules 106a-m). Fabric controllers 110a-n provide an interface between a respective node 102a-n and the data fabric 108. In some embodiments, the fabric controllers 110a-n control the issuance of operations to particular devices and/or notify threads 104a-n generating operations issued to the data fabric 108 that a particular operation is complete, as will be described in more detail below.

The system 100 also includes one or more media controllers 112a-m. In some embodiments, each memory module 106a-m includes or is associated with a corresponding media controller 112a-m. In other embodiments, a media controller 112a-m is associated with a plurality of memory modules (106a-m) (e.g., a "top-of-rack" media controller 112a-m). Media controllers 112a-m receive memory operations issued by nodes 102a-n via the data fabric 108 and control how the memory operations are issued to the associated memory modules 106a-m for execution.

For example, the nodes 102a-n issue atomic memory operations to memory modules 106a-m via the data fabric 108. Atomic memory operations are memory operations that are performed independent of other operations (e.g., cannot be interfered with by other operations). The media controller 112a-m of the memory module 106a-m to which the atomic memory operations are issued receives the atomic memory operations. Where multiple requestors (e.g., nodes 102a-n, threads 104a-n) are attempting to perform atomic memory operations on the same memory module 106a-m, the media controller 112a-m must perform arbitration to determine the ordering at which the atomic memory operations are issued to the memory module 106a-m.

Accordingly, each media controller 112a-m includes an atomics controller 114a-m configured to determine an ordering for issuing a plurality of atomic memory operations based on one or more arbitration rules. In some embodiments, the atomics controller 114a-m is a component of the media controller 112a-m. In other embodiments, the atomics controller 114a-m is a separate component communicatively coupled and accessible to the media controller 112a-m. In some embodiments, the arbitration rules are based on a history of atomic memory operations. The history of atomic memory operations describes a history of atomic memory operations issued by the media controller 112a-m. For example, in some embodiments, the atomics controller 114a-m maintains a history buffer storing information describing one or more issued atomic memory operations. In some embodiments, the history buffer stores, for a given issued atomic memory operation, an indication of a requestor that generated the atomic memory operation (e.g., an identifier of a node 102a-n or thread 104a-n). For example, the history buffer stores, for a given issued atomic memory operation, an Internet Protocol (IP) address, Media Access Controller (MAC) address, or other identifier. In some embodiments, the history buffer stores, for a given issued atomic memory operation, one or more time stamps indicating a time at which the atomic memory operation was received by the media controller 112a-m and/or issued by the media controller 112a-m to the memory modules 106a-m. In some embodiments, the history buffer stores, for a given issued atomic memory operation, an address in the corresponding memory module 106a-m to which the atomic memory operation was issued (e.g., a read address, a write address). In some embodiments, the history buffer stores, for a given issued atomic memory operation, an indication as to whether the atomic memory operation was performed successfully.

In some embodiments, determining the ordering for issuing the plurality of atomic memory operations by an atomics controller 114a-m includes determining, for each requestor (e.g., node 102a-n, thread 104a-n) associated with the plurality of atomic memory operations, a recency of access for the memory module 106a-m. The recency of access for the memory module 106a-m indicates when a given requestor last accessed (e.g., issued an atomic memory operation to) the memory module 106a-m associated with the media controller 112a-m. Accordingly, in some embodiments, the recency of access is determined based on the history buffer. The ordering is then based at least in part on the recency of access for each requestor. For example, the atomics controller 114a-m preferentially assigns an earlier position in the ordering to atomic memory operations associated a requestor with an older recency of access. Thus, requestors for which an atomic memory operation was not recently issued are favored, and received an earlier position in the ordering, compared to other requests for which an atomic memory operation was recently issued. Conversely, in other embodiments, the atomics controller 114a-m preferentially assigns an earlier position in the ordering to atomic memory operations associated with a newer (e.g., more recent) recency of access.

In some embodiments, the ordering is based on a recency or degree of success of previously issued memory operations for each requestor. For example, a success rate for a given requestor is determined based on indications of success in the history buffer. Accordingly, in some embodiments, the atomics controller 114a-m preferentially assigns an earlier position in the ordering to atomic memory operations associated with a higher success rate. Thus, the atomic memory operations associated with requestors with high success rates are preferentially issued before the atomic memory operations associated with less successful requestors. In other embodiments, the atomics controller 114*a-m* preferentially assigns an earlier position in the ordering to atomic memory operations associated with a lower success rate.

In some embodiments, determining the ordering for issuing the plurality of atomic memory operations includes determining, for each requestor (e.g., node 102*a-n*, thread 104*a-n*) associated with the plurality of atomic memory operations, a network distance to the media controller 112*a-m*. In some embodiments, the network distance includes a number of hops from the requestor to the media controller 112*a-m* (e.g., via the data fabric). Accordingly, in some embodiments, determining the network distance to the media controller 112*a-m* from a given requestor includes performing a trace route or other operation to determine the number of hops. In other embodiments, determining the network distance to the media controller 112*a-m* from a given requestor includes accessing a predefined value, table entry, or other data indicating the number of hops. In further embodiments, the network distance includes a latency between the given requestor and the media controller 112*a-m*. Accordingly, in some embodiments, determining the network distance for a given requestor includes sending a ping or otherwise querying the requestor for the latency. In other embodiments, the latency is dynamically calculated. For example, a message from the requestor (e.g., a message including an atomic memory operation) includes a time stamp indicating when the message was sent. The latency is then calculated as a difference between the time stamp and a time at which the message was received. Accordingly, in some embodiments, the ordering is based on the network distance for each requestor associated with the plurality of atomic memory operations. For example, in some embodiments, the atomics controller 114*a-m* preferentially assigns an earlier position in the ordering to atomic memory operations from requestors associated with a greater or lesser network distance.

The atomics controller 114*a-m* then issues the atomic memory operations to the associated memory module(s) 106*a-m* according to the ordering. In some embodiments, as atomic memory operations are received concurrent to other atomic memory operations being issued, the ordering is updated to include the newly received atomic memory operations.

In some embodiments, the atomics controller 115*a-n* is configured to monitor a rate at which atomic memory operations are received for issuing in order to determine whether a rate of receiving atomic memory operations falls below a threshold. The threshold is a predefined, configurable, or dynamically calculated threshold. In response to the rate falling below the threshold, the atomics controller 114*a-m* issues atomic memory operations independent of the one or more arbitration rules (e.g., without arbitration). In other words, the atomics controller 114*a-m* "sleeps" and the atomic memory operations are issued according to another policy (e.g., first-in, first out, and the like). In some embodiments, the atomics controller 114*a-m* "sleeps" for a predefined amount of time. In other embodiments, the atomics controller 114*a-m* is configured to continue monitoring the rate at which atomic memory operations are received in order to determine when the rate meets or exceeds the threshold. The atomics controller 114*a-m* then "wakes" and issues atomic memory operations according to the arbitration rules. In some embodiments, the atomics controller 114*a-m* continues to maintain the history buffer while "sleeping" such that, when the atomics controller 114*a-m* resumes issuing atomic memory operations according to the arbitration rules, the history buffer need not be repopulated.

In existing solutions where operations, including atomic memory operations or other operations, are requested by threads 104*a-n*, the thread 104*a-n* performs a context switch to allow another thread 104*a-n* to operate while the requesting thread 104*a-n* waits for a result of the operation (e.g., a returned value from a load operation and the like). This prevents the requesting thread 104*a-n* from potentially performing other operations, and incurs context switching overhead in switching to and from the requesting thread 104*a-n*. Instead, after requesting an operation via the fabric controller 110*a-n*, a requesting thread 104*a-n* is configured to perform one or more other actions instead of performing a context switch to another thread 104*a-n* during completion of the requested operation (e.g., while waiting for a result or response for the requested operation).

The fabric controller 110*a-n* then receives an indication that the operation is complete. For example, in some embodiments, a media controller 112*a-m* sends, to the fabric controller 110*a-n*, an indication that a requested atomic memory operation is complete. As another example, where the request includes a task to be performed by a hardware accelerator such as a Graphics Processing Unit (GPU), the device requested to perform the operation provides an indication to the fabric controller 110*a-n* that the operation is complete. In some embodiments the received indication includes a result or response for the requested operation.

The fabric controller 110*a-n* then indicates, to the requesting thread 104*a-n*, that the requested operation is complete. In some embodiments, the fabric controller 110*a-n* indicates that the requested operation is complete by sending an interrupt to the thread 104*a-n*. In other embodiments, the fabric controller 110*a-n* indicates that the requested operation is complete by modifying a value of a register accessible to the thread 104*a-n*. For example, the thread 104*a-n* is configured to monitor or poll the register to determine if a predefined value is stored in the register. In further embodiments, a non-register portion of allocated memory is used to store the value indicating that the requested operation is complete.

In some embodiments, the fabric controller 110*a-n* receives a request directed to a first device. For example, the first device includes a Graphics Processing Unit the request includes a request for the Graphics Processing Unit to perform a particular operation and return a result. The fabric controller 110*a-n* then determines whether to issue the request to a second device different from the first device. For example, the fabric controller 110*a-n* tracks a rate at which requests are provided to particular devices, or poll devices for current load metrics. The fabric controller 110*a-n* then determines to issue the request to a second device in response to one or more conditions associated with the first device being satisfied. For example, the second device (e.g., a second Graphics Processing Unit) is experiencing less load or has been issued fewer requests relative to the first device. The fabric controller 110*a-n* then issues the request to the second device instead of the first device, therefore providing "load balancing" for requests issued to devices by threads 104*a-n*.

Figure 2:
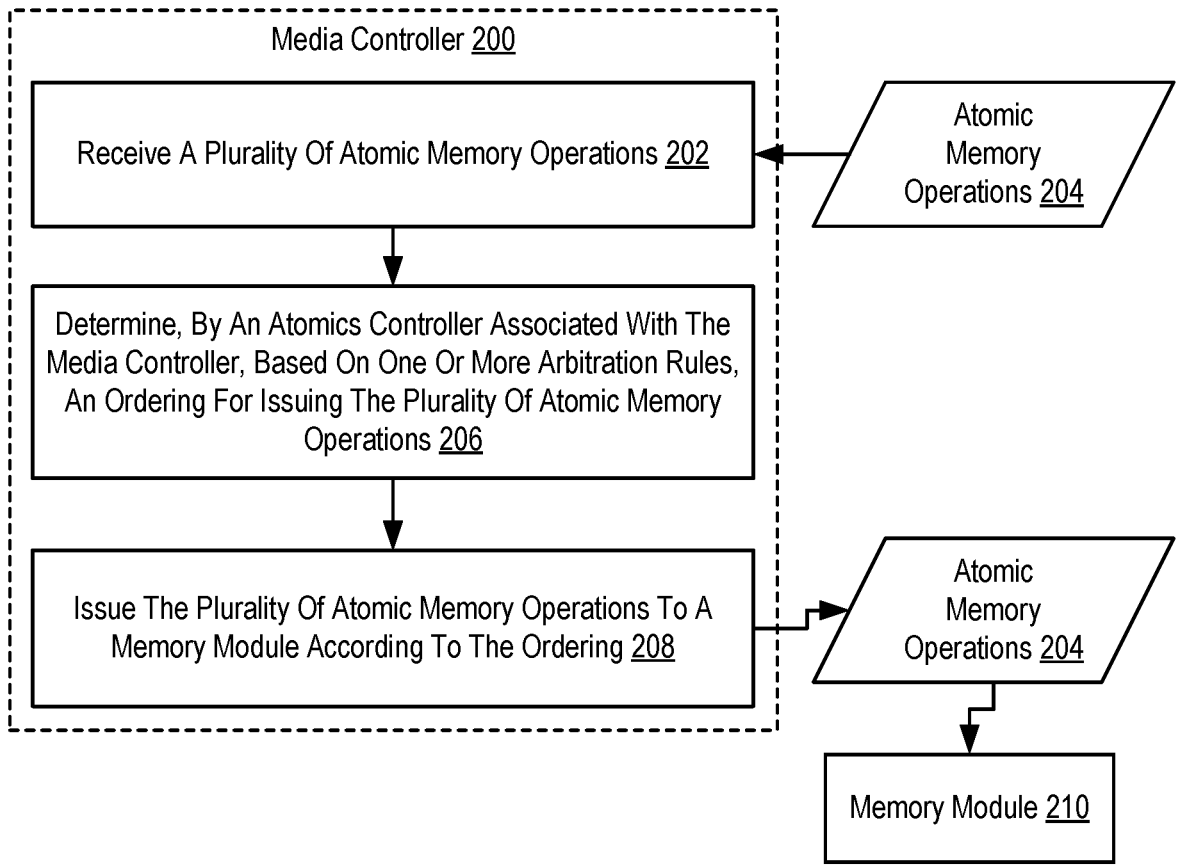
FIG. 2 is a flowchart of an example method for arbitrating atomic memory operations according to some embodiments.

For further explanation, FIG. 2 sets forth a flow chart illustrating an exemplary method for arbitrating atomic memory operations that includes receiving 202, by a media controller 200, a plurality of atomic memory operations 204. The atomic memory operations 204 are received from one or more requestors (e.g., nodes 102*a-n*, threads 104*a-n*) via a data fabric 108. The method of FIG. 2 also includes determining 206, by an atomics controller (e.g., an atomics controller 114*a-m*) associated with the media controller 200, based on one or more arbitration rules, an ordering for issuing the plurality of atomic memory operations 204. The ordering defines a sequence at which the plurality of atomic memory operations 204 are issued to their respective memory module(s) 210 for execution. For example, an atomic memory operation 204 "earlier" in the ordering will be issued before an atomic memory operation 204 "later" in the ordering.

In some embodiments, the arbitration rules are based on a history of atomic memory operations. The history of atomic memory operations describes a history of atomic memory operations issued by the media controller 112a-m. For example, in some embodiments, the atomics controller 114a-m maintains a history buffer storing information describing one or more issued atomic memory operations. In some embodiments, the history buffer stores, for a given issued atomic memory operation, an indication of a requestor that generated the atomic memory operation (e.g., an identifier of a node 102a-n or thread 104a-n). For example, the history buffer stores, for a given issued atomic memory operation, an Internet Protocol (IP) address, Media Access Controller (MAC) address, or other identifier. In some embodiments, the history buffer stores, for a given issued atomic memory operation, one or more time stamps indicating a time at which the atomic memory operation was received by the media controller 112a-m and/or issued by the media controller 112a-m to the memory modules 106a-m. In some embodiments, the history buffer stores, for a given issued atomic memory operation, an address in the corresponding memory module 106a-m to which the atomic memory operation was issued (e.g., a read address, a write address). In some embodiments, the history buffer stores, for a given issued atomic memory operation, an indication as to whether the atomic memory operation was performed successfully.

In some embodiments, determining 206 the ordering for issuing the plurality of atomic memory operations 204 includes determining, for each of the atomic memory operations 204, a weighted score or evaluation. For example, the one or more arbitration rules define a degree to which a particular attribute of an atomic memory operation 204 affects its corresponding score. Such attributes include, for example, a recency of receiving or issuing a previous atomic memory operation 204 for an associated requestor, a network distance for an associated requestor, and/or a success rate for issuing atomic memory operations 204 for the given requestor, and the like.

The method of FIG. 2 also includes issuing 208 the plurality of atomic memory operations 204 to a memory module 210 according to the ordering. In some embodiments, as atomic memory operations 204 are received concurrent to other atomic memory operations 208 being issued 208, the ordering is updated to include the newly received atomic memory operations 204.

Figure 3:
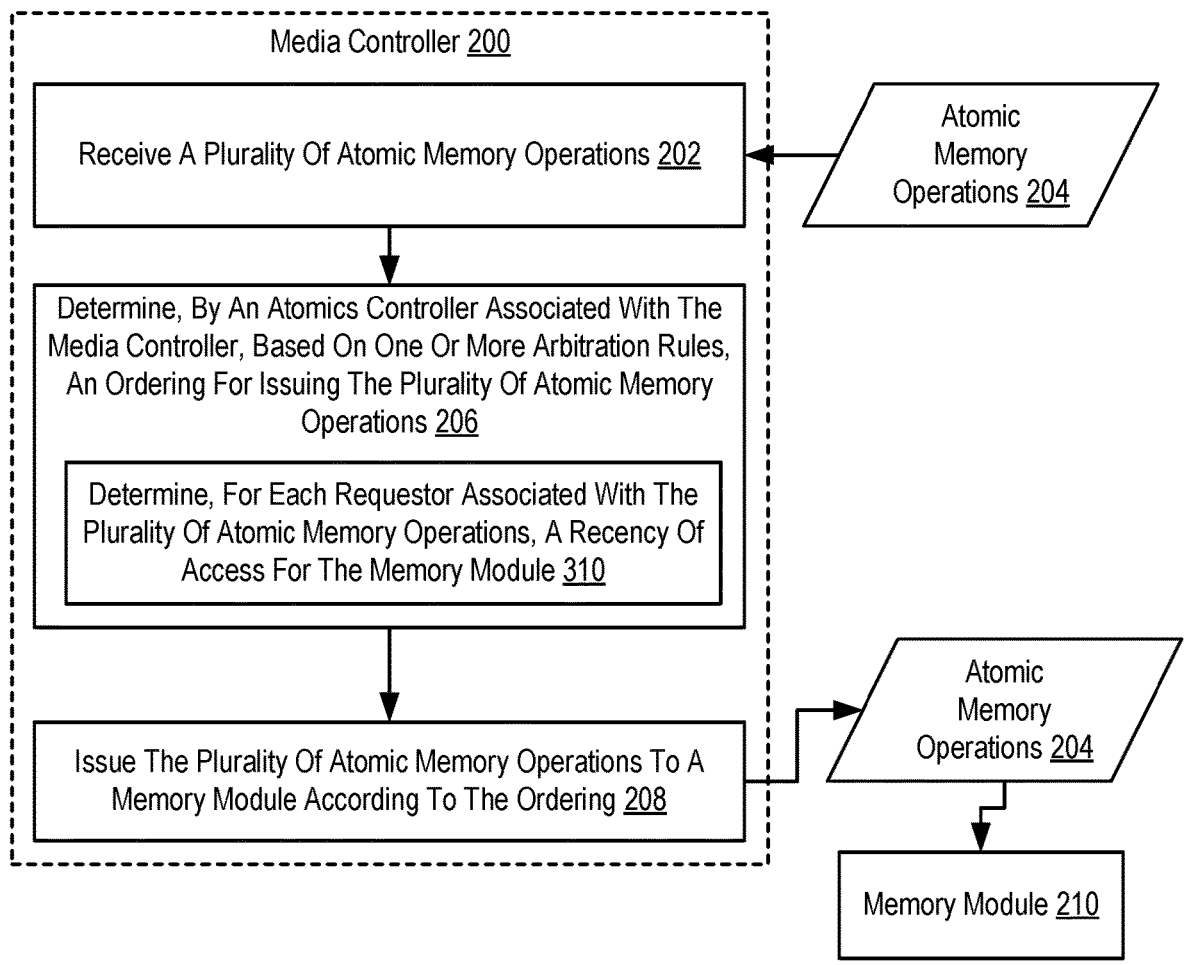
FIG. 3 is a flowchart of an example method for arbitrating atomic memory operations according to some embodiments.

For further explanation, FIG. 3 sets forth a flow chart illustrating an exemplary method for arbitrating atomic memory operations that includes receiving 202, by a media controller 200, a plurality of atomic memory operations 204; determining 206, by an atomics controller (e.g., an atomics controller 114a-m) associated with the media controller 200, based on one or more arbitration rules, an ordering for issuing the plurality of atomic memory operations 204; and issuing 208 the plurality of atomic memory operations 204 to a memory module 210 according to the ordering.

The method of FIG. 3 differs from FIG. 2 in that determining 206, by an atomics controller associated with the media controller 200, based on one or more arbitration rules, an ordering for issuing the plurality of atomic memory operations 204 includes determining 310, for each requestor (e.g., node 102a-n, thread 104a-n) associated with the plurality of atomic memory operations 204, a recency of access for the memory 210. The recency of access for the memory module 210 indicates when a given requestor last accessed (e.g., issued an atomic memory operation 204 to) the memory module 210. Accordingly, in some embodiments, the recency of access is determined based on the history buffer. The determined ordering is then based at least in part on the recency of access for each requestor. For example, the atomics controller preferentially assigns an earlier position in the ordering or assigns a greater weight or score to atomic memory operations 204 associated a requestor with an older recency of access. Thus, requestors for which an atomic memory operation 204 was not recently issued are favored, and received an earlier position in the ordering, compared to other requests for which an atomic memory operation was recently issued. Conversely, in other embodiments, the atomics controller preferentially assigns an earlier position in the ordering or assigns a higher weight or score to atomic memory operations 204 associated with a newer (e.g., more recent) recency of access.

Figure 4:
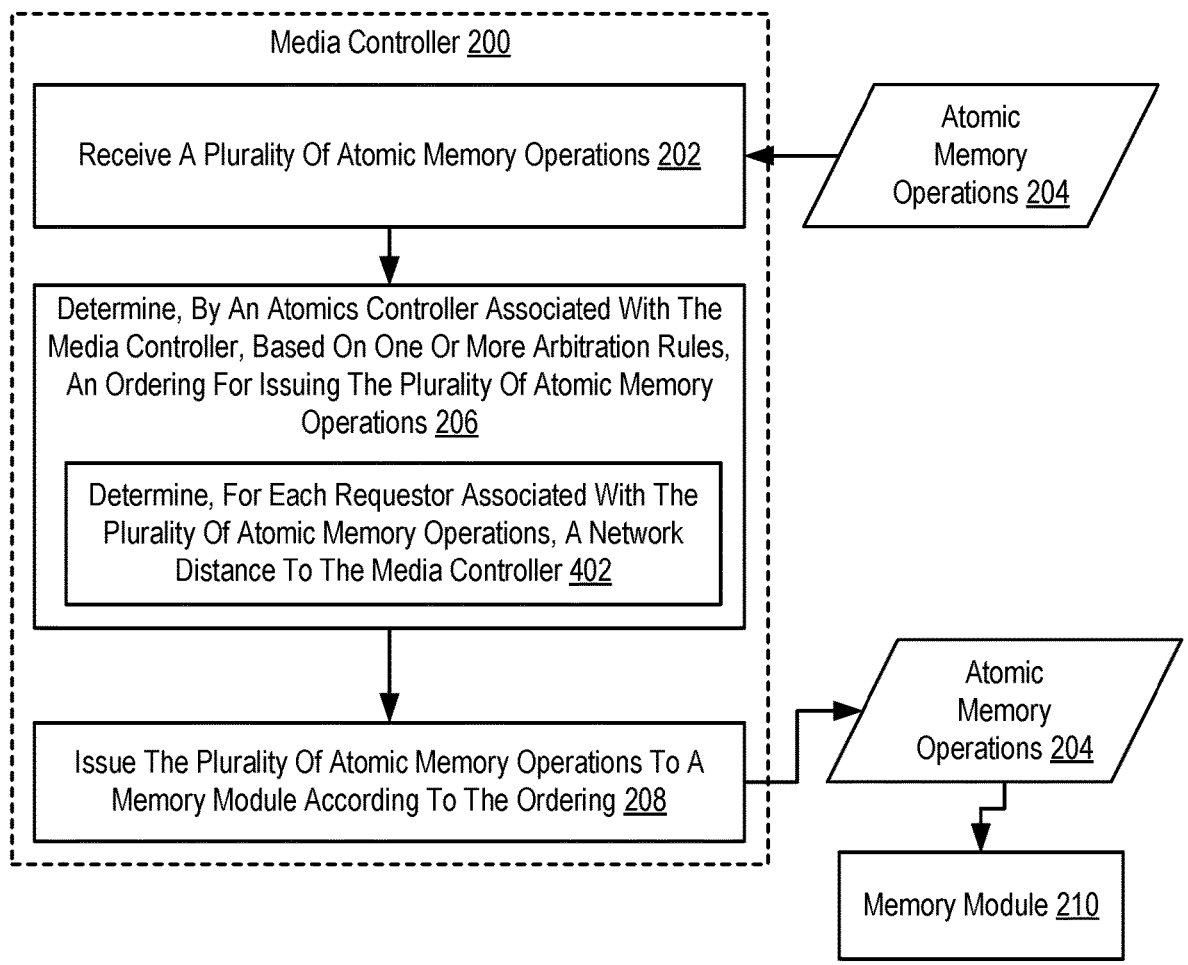
FIG. 4 is a flowchart of an example method for arbitrating atomic memory operations according to some embodiments.

For further explanation, FIG. 4 sets forth a flow chart illustrating an exemplary method for arbitrating atomic memory operations that includes receiving 202, by a media controller 200, a plurality of atomic memory operations 204; determining 206, by an atomics controller (e.g., an atomics controller 114a-m) associated with the media controller 200, based on one or more arbitration rules, an ordering for issuing the plurality of atomic memory operations 204; and issuing 208 the plurality of atomic memory operations 204 to a memory module 210 according to the ordering.

The method of FIG. 4 differs from FIG. 2 in that determining 206, by an atomics controller associated with the media controller 200, based on one or more arbitration rules, an ordering for issuing the plurality of atomic memory operations 204 includes determining 402, for each requestor (e.g., node 102a-n, thread 104a-n) associated with the plurality of atomic memory operations 204, a network distance to the media controller 200. In some embodiments, the network distance includes a number of hops from the requestor to the media controller 200 (e.g., via the data fabric 108). Accordingly, in some embodiments, determining the network distance to the media controller 200 from a given requestor includes performing a trace route or other operation to determine the number of hops. In other embodiments, determining the network distance to the media controller 200 from a given requestor includes accessing a predefined value, table entry, or other data indicating the number of hops. In further embodiments, the network distance includes a latency between the given requestor and the media controller 200. Accordingly, in some embodiments, determining the network distance for a given requestor includes sending a ping or otherwise querying the requestor for the latency. In other embodiments, the latency is dynamically calculated. For example, a message from the requestor (e.g., a message including an atomic memory operation 204) includes a time stamp indicating when the message was sent. The latency is then calculated as a difference between the time stamp and a time at which the message was received. Accordingly, in some embodiments, the ordering is based on the network distance for each requestor associated with the plurality of atomic memory operations 204. For example, in some embodiments, the atomics controller 114a-m preferentially assigns an earlier position in the ordering or a higher score or weight to atomic memory operations 204 from requestors associated with a greater or lesser network distance.

Figure 5:
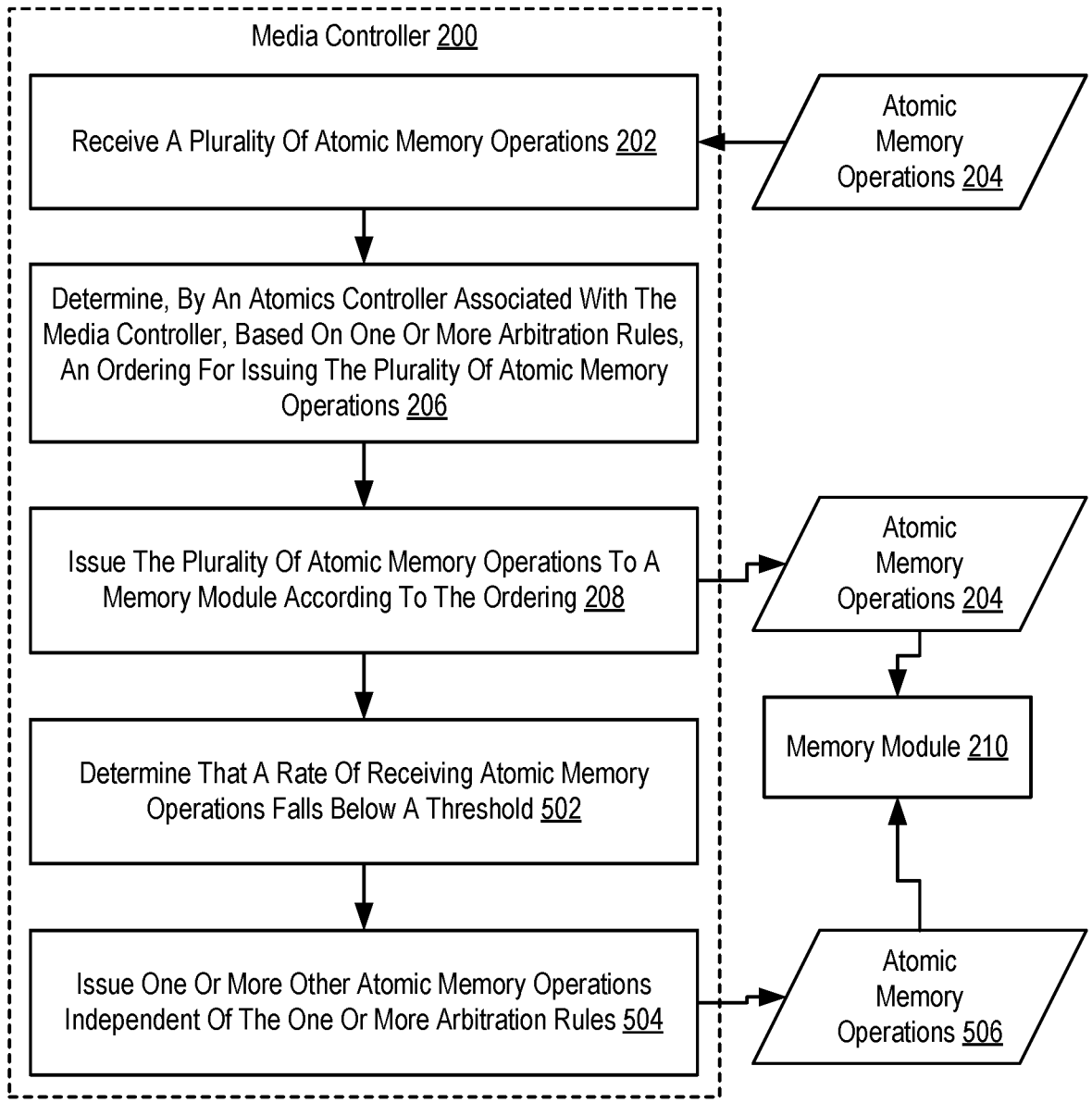
FIG. 5 is a flowchart of an example method for arbitrating atomic memory operations according to some embodiments.

For further explanation, FIG. 5 sets forth a flow chart illustrating an exemplary method for arbitrating atomic memory operations that includes receiving 202, by a media controller 200, a plurality of atomic memory operations 204; determining 206, by an atomics controller (e.g., an atomics controller 114*a-m*) associated with the media controller 200, based on one or more arbitration rules, an ordering for issuing the plurality of atomic memory operations 204; and issuing 208 the plurality of atomic memory operations 204 to a memory module 210 according to the ordering.

The method of FIG. 5 differs from FIG. 2 in that the method of FIG. 5 also includes determining 502 that a rate of receiving atomic memory operations falls below a threshold. The threshold is a predefined, configurable, or dynamically calculated threshold. The method of FIG. 5 also includes issuing 504 one or more other atomic memory operations 506 independent of the one or more arbitration rules (e.g., without arbitration). In other words, the atomics controller "sleeps" and the atomic memory operations are issued according to another policy (e.g., first-in, first out, and the like). In some embodiments, the atomics controller "sleeps" for a predefined amount of time. In other embodiments, the atomics controller is configured to continue monitoring the rate at which atomic memory operations are received in order to determine when the rate meets or exceeds the threshold. The atomics controller then "wakes" and issues atomic memory operations according to the arbitration rules. In some embodiments, the atomics controller continues to maintain the history buffer while "sleeping" such that, when the atomics controller resumes issuing atomic memory operations according to the arbitration rules, the history buffer need not be repopulated.

Figure 6:
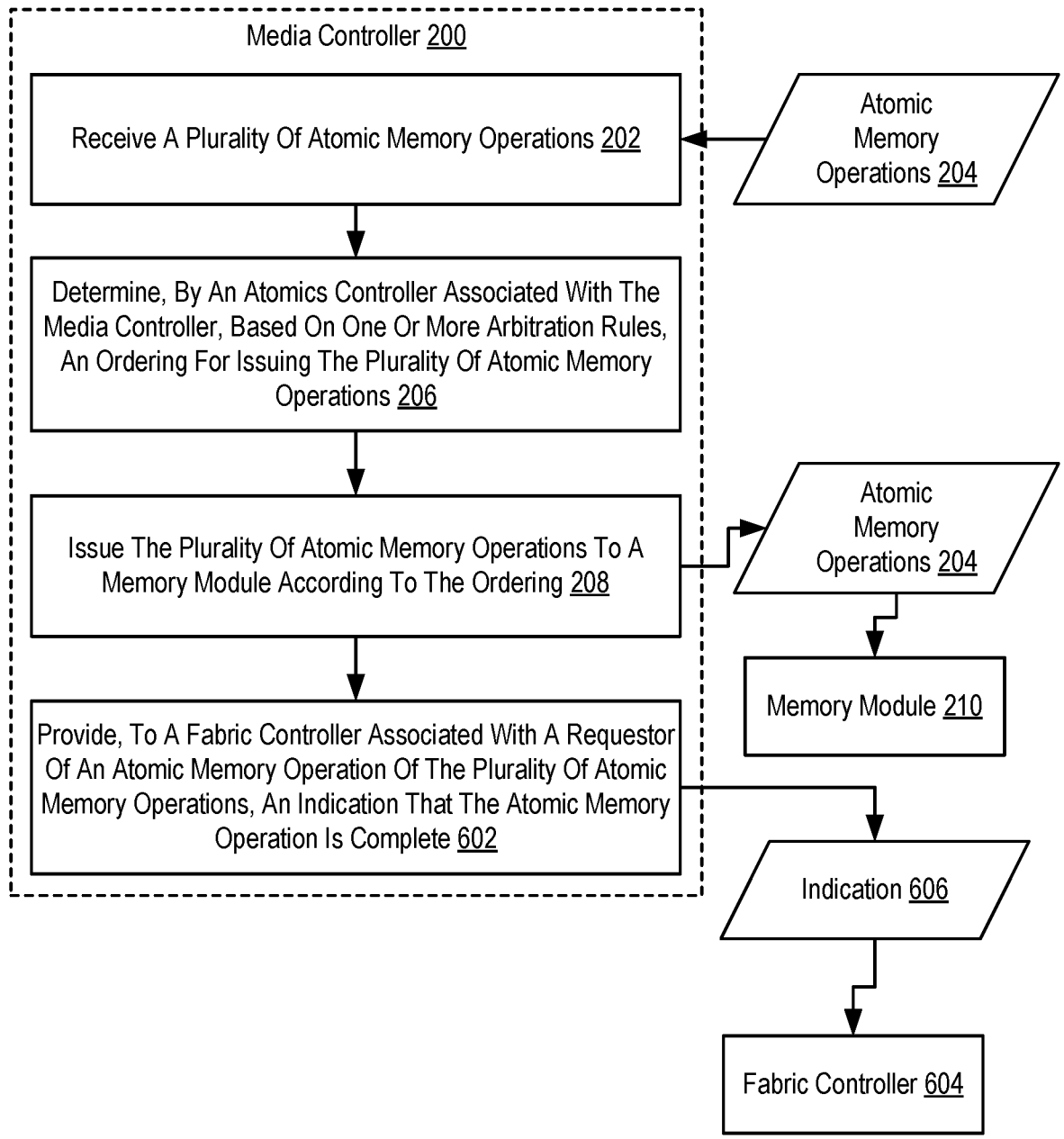
FIG. 6 is a flowchart of an example method for arbitrating atomic memory operations according to some embodiments.

For further explanation, FIG. 6 sets forth a flow chart illustrating an exemplary method for arbitrating atomic memory operations that includes receiving 202, by a media controller 200, a plurality of atomic memory operations 204; determining 206, by an atomics controller (e.g., an atomics controller 114*a-m*) associated with the media controller 200, based on one or more arbitration rules, an ordering for issuing the plurality of atomic memory operations 204; and issuing 208 the plurality of atomic memory operations 204 to a memory module 210 according to the ordering.

The method of FIG. 6 differs from FIG. 2 in that the method of FIG. 6 also includes providing 602, to a fabric controller 604 associated with a request of an atomic memory operation 204 of the plurality of atomic memory operations 204, an indication 606 that the atomic memory operation 204 is complete. The indication 606 includes a message or signal from the media controller 200 to the fabric controller 604 of the requestor (e.g., a fabric controller 604 of a node 102*a-n* executing a thread 104*a-n* that generated the atomic memory operation 204). Providing 602 the indication 606 causes the fabric controller 604 to indicate, to the requesting thread 102*a-n*, that the atomic memory operation 204 is complete. For example, the fabric controller 604 generates an interrupt for the requesting thread 102*a-n* or stores a value in a register or other area of memory monitored by the requesting thread 102*a-n*.

Figure 7:
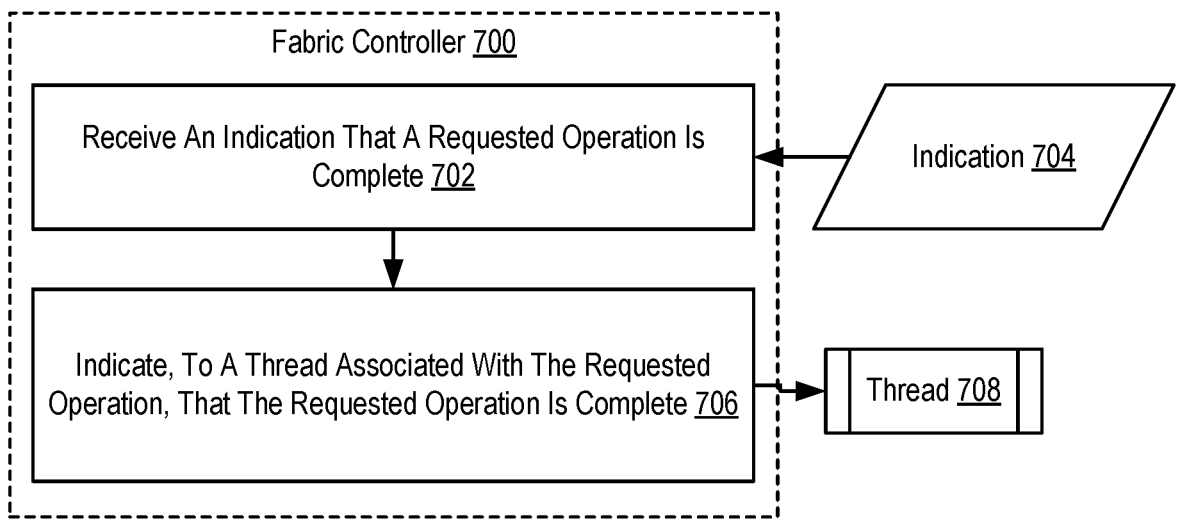
FIG. 7 is a flowchart of an example method for handling data fabric events according to some embodiments.

For further explanation, FIG. 7 sets forth a flow chart illustrating an exemplary method for handling data fabric events that includes receiving 702, by a fabric controller 700, an indication 704 that a requested operation is complete. For example, in some embodiments, a media controller 112*a-m* sends, to the fabric controller 700, an indication 704 that a requested atomic memory operation is complete. As another example, where the request includes a task to be performed by a hardware accelerator such as a Graphics Processing Unit (GPU), the device requested to perform the operation provides an indication 704 to the fabric controller 700 that the operation is complete. In some embodiments the received indication 704 includes a result or response for the requested operation. The method of FIG. 7 also includes indicating 706, by the fabric controller 700, to a thread 708 associated with the requested operation, that the requested operation is complete. In existing solutions where operations, including atomic memory operations or other operations, are requested by threads 708, the thread 708 performs a context switch to allow another thread 708 to operate while the requesting thread 708 waits for a result of the operation (e.g., a returned value from a load operation and the like). This prevents the requesting thread 708 from potentially performing other operations, and incurs context switching overhead in switching to and from the requesting thread 708. Instead, after requesting an operation via the fabric controller 700, a requesting thread 708 is configured to perform one or more other actions instead of performing a context switch to another thread 708 during completion of the requested operation (e.g., while waiting for the fabric controller 700 to indicate to the thread 708 that the requested operation is complete).

Figure 8:
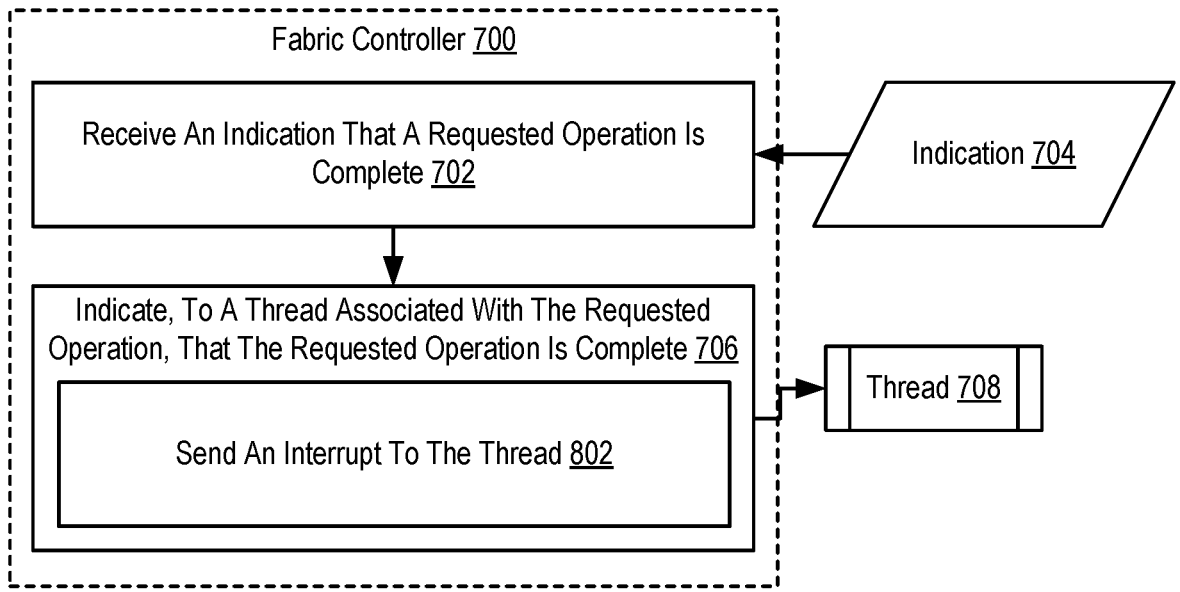
FIG. 8 is a flowchart of an example method for handling data fabric events according to some embodiments.

For further explanation, FIG. 8 sets forth a flow chart illustrating an exemplary method for handling data fabric events that includes receiving 702, by a fabric controller 700, an indication 704 that a requested operation is complete; and indicating 706, by the fabric controller 700, to a thread 708 associated with the requested operation, that the requested operation is complete.

The method of FIG. 8 differs from FIG. 7 in that indicating 706, by the fabric controller 700, to a thread 708 associated with the requested operation, that the requested operation is complete includes sending 802 an interrupt to the thread 708. Thus, the thread 708 performs operations dependent on completing the requested operation after receiving the interrupt.

Figure 9:
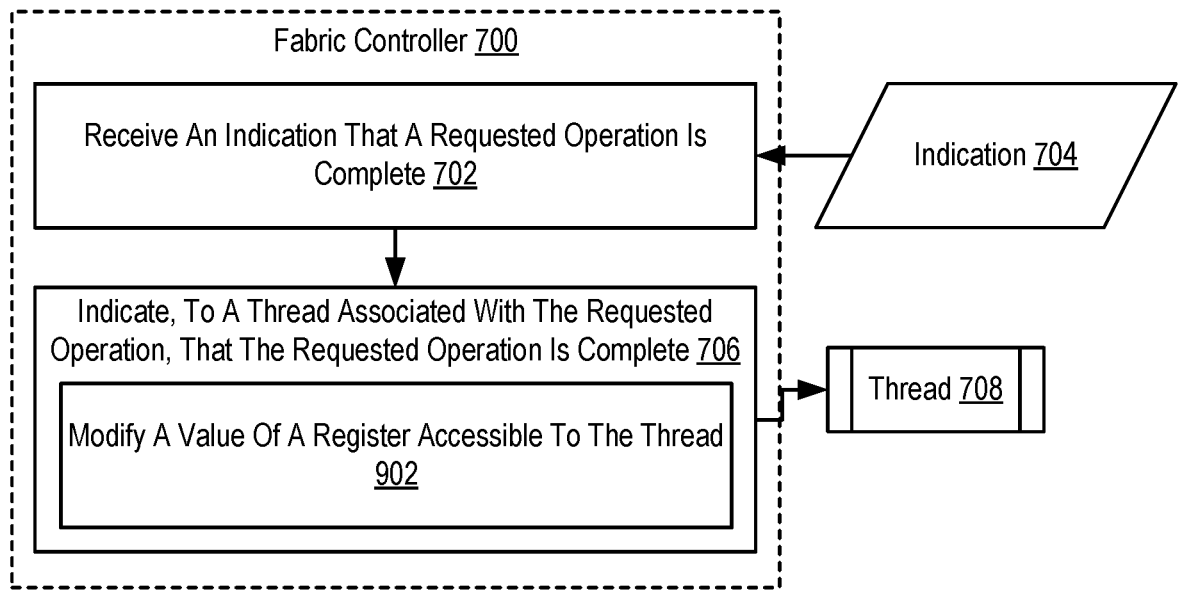
FIG. 9 is a flowchart of an example method for handling data fabric events according to some embodiments.

For further explanation, FIG. 9 sets forth a flow chart illustrating an exemplary method for handling data fabric events that includes receiving 702, by a fabric controller 700, an indication 704 that a requested operation is complete; and indicating 706, by the fabric controller 700, to a thread 708 associated with the requested operation, that the requested operation is complete.

The method of FIG. 9 differs from FIG. 7 in that indicating 706, by the fabric controller 700, to a thread 708 associated with the requested operation, that the requested operation is complete includes modifying 902 a value of a register accessible to the thread 708. For example, the thread 708 is configured to monitor or poll the register to determine if a predefined value is stored in the register. In further embodiments, a non-register portion of allocated memory is used to store the value indicating that the requested operation is complete.

Figure 10:
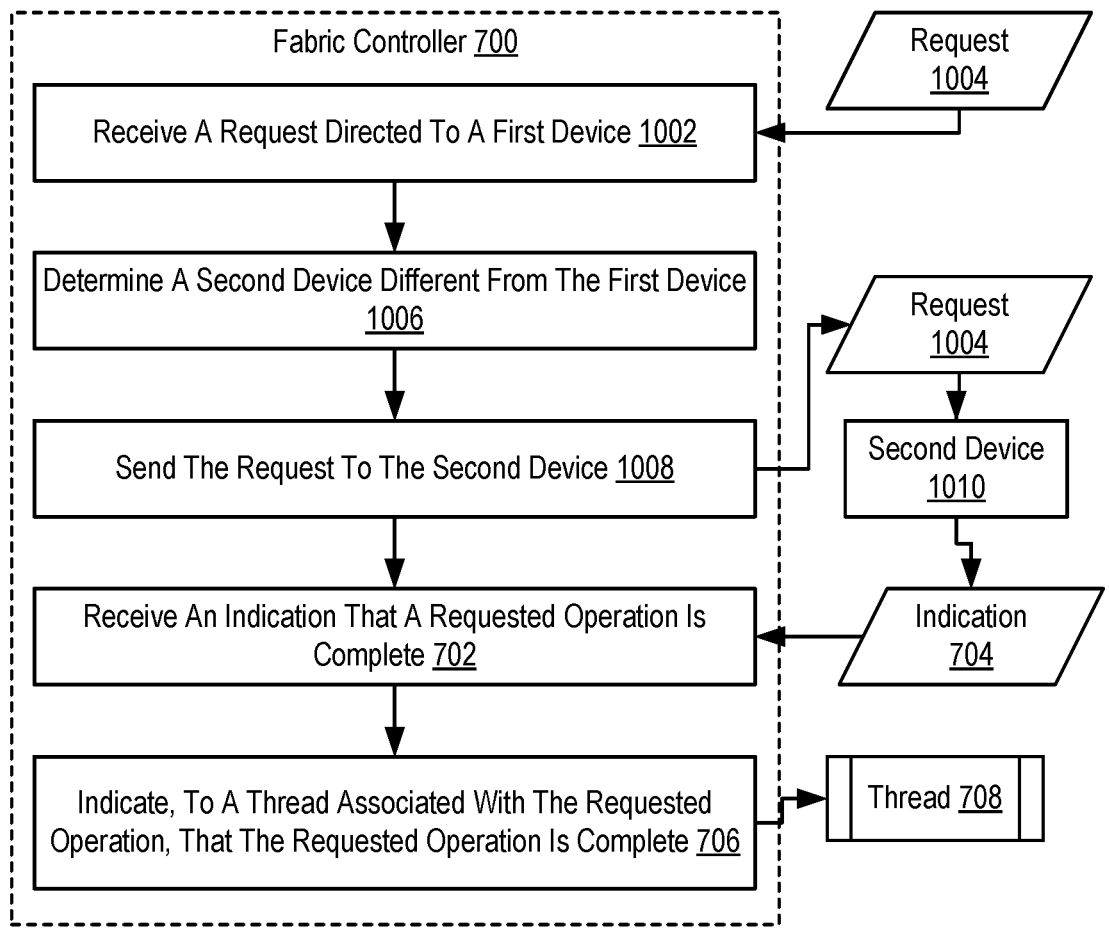
FIG. 10 is a flowchart of an example method for handling data fabric events according to some embodiments.

For further explanation, FIG. 10 sets forth a flow chart illustrating an exemplary method for handling data fabric events that includes receiving 702, by a fabric controller 700, an indication 704 that a requested operation is complete; and indicating 706, by the fabric controller 700, to a thread 708 associated with the requested operation, that the requested operation is complete.

The method of FIG. 10 differs from FIG. 7 in that the method of FIG. 10 also includes receiving 1002 a request 1004 directed to a first device. The request 1004 is a request to perform the operation. As an example, the first device includes a Graphics Processing Unit or other hardware acceleration and the request 1004 includes a request for the first device to perform a particular operation or computation and return a result. The method of FIG. 10 also includes determining a second device 1010 different from the first device. The second device 1010 is of a same type as the first device (e.g., another Graphics Processing Unit or other hardware accelerator). For example, the fabric controller 700 tracks a rate at which requests are provided to particular devices, or poll devices for current load metrics. The fabric controller 700 then determines 1006 second device 1010 in response to one or more conditions associated with the first device being satisfied. For example, the second device 1010 experiencing less load or has been issued fewer requests relative to the first device.

The method of FIG. 10 also includes sending 1008 the request 1004 to the second device 1010. The second device 1010 then performs the operation indicated in the request and provides the indication 704 received 702 by the fabric controller. Thus, the fabric controller 700 implements "load balancing" in order to ensure that requested operations are optimally distributed amongst capable devices.

In view of the explanations set forth above, readers will recognize that the benefits of arbitrating atomic memory operations include:

Improved performance of a computing system by allowing for competing atomic memory operations to be issued to memory modules in a fair manner.

Improved performance of a computing system by allowing for an atomics controller to operate according to rates at which atomic memory operations are received, saving on power.

In view of the explanations set forth above, readers will recognize that the benefits of handling data fabric events include:

Improved performance of a computing system by allowing for a thread requesting performance of an operation to continue operating while waiting for the result, saving on context switching overhead that would result from context switching to another thread.

Exemplary embodiments of the present disclosure are described largely in the context of a fully functional computer system for arbitrating atomic memory operations. Readers of skill in the art will recognize, however, that the present disclosure also can be embodied in a computer program product disposed upon computer readable storage media for use with any suitable data processing system. Such computer readable storage media can be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The computer readable program instructions may comprise register transfer language (RTL) instructions which provide a representation of a circuit design implementing aspects of embodiments of the present invention. Additionally or alternatively, the computer readable program instructions may comprise instructions for the layout of a circuit implementing aspects of embodiments of the present invention. Examples of such layout instructions include GDS-II and OASIS language instructions.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes can be made in various embodiments of the present disclosure. The descriptions in this specification are for purposes of illustration only and are not to be construed in a limiting sense. The scope of the present disclosure is limited only by the language of the following claims.

What is claimed is:

1. A method of arbitrating atomic memory operations, the method comprising:
    issuing a plurality of atomic memory operations received by an atomics controller to a memory module responsive to ordering the plurality of atomic memory operations based on one or more arbitration rules and a history of two or more issued atomic memory operations, wherein the history of the two or more issued atomic memory operations indicates a recency of access of the memory module by a particular requestor associated with the two or more issued atomic memory operations.

2. The method of claim 1 wherein:
    ordering the plurality of atomic memory operations comprises determining, for each requestor associated with the plurality of atomic memory operations, a recency of access for the memory module; and
    the ordering is based on the recency of access for each requestor associated with the plurality of atomic memory operations.

3. The method of claim 1 wherein:
    ordering the plurality of atomic memory operations comprises determining, for each requestor associated with the plurality of atomic memory operations, a network distance to a media controller associated with the atomics controller; and
    the ordering is based on the network distance for each requestor associated with the plurality of atomic memory operation.

4. The method of claim 3, wherein the network distance comprises a latency.

5. The method of claim 3, wherein the network distance comprises a number of hops to the media controller.

6. The method of claim 1, further comprising:
    determining that a rate of receiving atomic memory operations falls below a threshold; and
    issuing one or more other atomic memory operations independent of the one or more arbitration rules.

7. The method of claim 1, further comprising providing, by a media controller associated with the atomics controller, to a fabric controller associated with a requestor of an atomic memory operation of the plurality of atomic memory operations, an indication that the atomic memory operation is complete.

8. A non-transitory computer readable media storing instructions that, when executed by a processor, are configured to:
    issue a plurality of atomic memory operations received by an atomics controller to a memory module responsive to ordering the plurality of atomic memory operations based on one or more arbitration rules and a history of two or more issued atomic memory operations, wherein the history of the two or more issued atomic memory operations indicates a recency of access of the memory module by a particular requestor associated with the two or more issued atomic memory operations.

9. The non-transitory computer readable media of claim 8, wherein the history of atomic memory operations is stored in a buffer.

10. The non-transitory computer readable media of claim 9, wherein the buffer further stores one or more of an indication of each requestor that generated the atomic memory operations, a time at which the atomic memory operation was received by a media controller associated with the atomics controller, an address corresponding to a memory module to which the atomic memory operation was issued, or an indication as to whether the atomic memory operation was successful.

11. The non-transitory computer readable media of claim 8, wherein the ordering for issuing the plurality of atomic memory operations is determined, for each of the atomic memory operations, based on a weighted score of attributes of the atomic memory operation.

12. An apparatus for arbitrating atomic memory operations, the apparatus comprising:
a media controller; and
an atomics controller, wherein the media controller:
receives a plurality of atomic memory operations;
determines based on one or more arbitration rules and a history of two or more atomic memory operations issued by the media controller, an ordering for issuing the plurality of atomic memory operations, wherein the history of the two or more issued atomic memory operations indicates a recency of access of a memory module by a particular requestor associated with the two or more issued atomic memory operations; and
issues the plurality of atomic memory operations to the memory module according to the ordering.

13. The apparatus of claim 12 wherein:
determining the ordering for issuing the plurality of atomic memory operations comprises determining, for each requestor associated with the plurality of atomic memory operations, a recency of access for the memory module; and
the ordering is based on the recency of access for each requestor associated with the plurality of atomic memory operations.

14. The apparatus of claim 12 wherein:
determining the ordering for issuing the plurality of atomic memory operations comprises determining, for each requestor associated with the plurality of atomic memory operations, a network distance to the media controller; and
the ordering is based on the network distance for each requestor associated with the plurality of atomic memory operation.

15. The apparatus of claim 14, wherein the network distance comprises a latency.

16. The apparatus of claim 14, wherein the network distance comprises a number of hops to the media controller.

17. The apparatus of claim 12, wherein the media controller:
determines that a rate of receiving atomic memory operations falls below a threshold; and
issues one or more other atomic memory operations independent of the one or more arbitration rules.

18. The apparatus of claim 12, wherein the media controller provides, to a fabric controller associated with a requestor of an atomic memory operation of the plurality of atomic memory operations, an indication that the atomic memory operation is complete.

19. The apparatus of claim 18, wherein the indication that the atomic memory operation is complete is configured to cause the fabric controller to generate an interrupt for the requestor of the atomic memory operation.

20. The apparatus of claim 18, wherein the indication that the atomic memory operation is complete is configured to cause the fabric controller to store a value in a register monitored by the requestor of the atomic memory operation.

21. The apparatus of claim 12, wherein the history of atomic memory operations is stored in a buffer.

22. The apparatus of claim 21, wherein the buffer further stores one or more of an indication of each requestor that generated the atomic memory operations, a time at which the atomic memory operation was received by the media controller, an address corresponding to a memory module to which the atomic memory operation was issued, or an indication as to whether the atomic memory operation was successful.

23. The apparatus of claim 12, wherein determining the ordering for issuing the plurality of atomic memory operations comprises determining, for each of the atomic memory operations, a weighted score of attributes of the atomic memory operation.

* * * * *